(12) United States Patent
Deschler et al.

(10) Patent No.: US 8,076,606 B2
(45) Date of Patent: Dec. 13, 2011

(54) EQUIPMENT AND METHOD FOR FUSING TOGETHER LAMINAR BANDS

(75) Inventors: Marc Deschler, Aachen (DE); Dirk Hänsch, Hauset (BE); Peter Ott, Remagen (DE)

(73) Assignee: 4JET Sales + Service GmbH, Alsdorf (DE)

( * ) Notice: Subject to any disclaimer, the term of this patent is extended or adjusted under 35 U.S.C. 154(b) by 804 days.

(21) Appl. No.: 12/222,012

(22) Filed: Jul. 31, 2008

(65) Prior Publication Data

US 2009/0039058 A1 Feb. 12, 2009

(30) Foreign Application Priority Data

Aug. 2, 2007 (EP) .................................... 07015181

(51) Int. Cl.
*B23K 26/08* (2006.01)
*B23K 26/24* (2006.01)
(52) U.S. Cl. .............. 219/121.63; 156/272.8; 156/275.1
(58) Field of Classification Search .................. 219/121.63–121.66; 156/272.8, 156/275.1
See application file for complete search history.

(56) References Cited

U.S. PATENT DOCUMENTS

| 3,384,526 A | 5/1968 | Abramson et al. | |
| 4,664,738 A * | 5/1987 | Tadros | 156/275.1 |
| 7,297,222 B2 * | 11/2007 | Chen | 156/272.8 |

FOREIGN PATENT DOCUMENTS

| DE | 84 474 | 9/1971 |
| DE | 20 2006 014 872 | 11/2006 |
| EP | 200 329 | 11/1986 |
| EP | 1 098 751 | 5/2001 |
| EP | 1 479 507 | 11/2004 |
| WO | 00/03865 | 1/2000 |

* cited by examiner

*Primary Examiner* — Samuel M Heinrich
(74) *Attorney, Agent, or Firm* — Clark & Brody

(57) ABSTRACT

Equipment (1) with which to fuse to each other at least two superposed laminar bands (2) and comprising two compressing members (3, 4) subtending between themselves a compression gap (5) through which said laminar bands (2) are guided. Additionally the equipment (1) comprises a laser (7) configured in a manner to transmit laser radiation (8) passing through the first compression member (3) and the compression gap (5) in the direction of the second compression member (4). According to the invention, the second compression member (4) is constituted by a resiliently borne sheetmetal-like support (9) which mechanically resiliently loads the laminar bands (2) in the compression gap (5) in the direction of the first compression member (3).

22 Claims, 1 Drawing Sheet

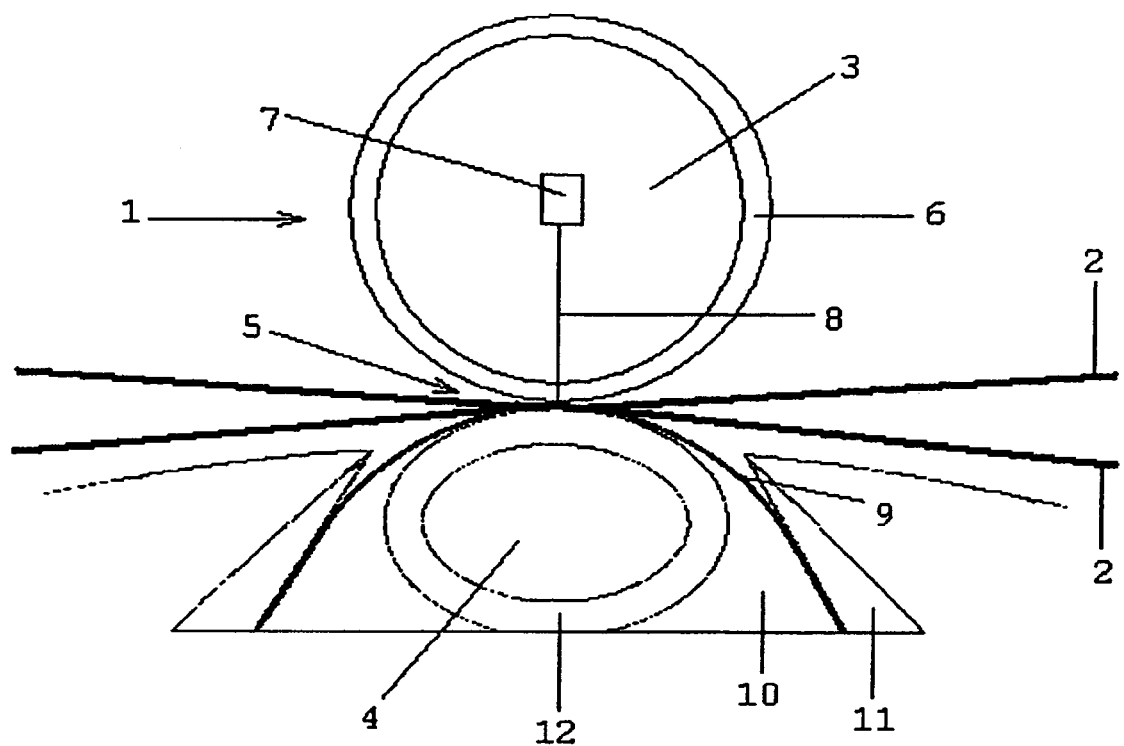

EQUIPMENT AND METHOD FOR FUSING TOGETHER LAMINAR BANDS

The present invention relates to equipment for fusing together at least two superposed laminar bands and comprising two compressing members subtending between them a compression gap through which said laminar bands are guided, further comprising a laser configured in such a way it shall radiate through the first compressing member and the compression gap in the direction of the second compressing member. The present invention moreover relates to a method for fusing said laminar bands.

Such equipment is illustratively known from the patent document WO 00/03865. The equipment described therein is designed to fuse into each other two superposed laminar bands. The laminar bands are position within a compression gap subtended by two compressing members. A laser radiates through the first compressing member into the compression gap in the direction of the second compressing member. Part of the laser radiation heating the compression gap is absorbed by the laminar bands. The remainder of the laser beam is incident on a specular surface of the second compressing member where it is reflected at least partly back toward the first compressing member. The reflected laser beam also contributes to heat the laminar bands in the compression gap. The laminar bands molten in the region to be fused combine under the pressure applied by the compressing members into a fusing seam.

It was found that the quality of the seam substantially depends on how and to what extent the superposed laminar bands are mutually compressed during fusing. Frequently, when the compressing member of the state of the art is used, it will be difficult to generate the required compression accurately in the fusing zone at the time of fusing. As a result the fused seam may not be made with the required uniformity and quality. This problem may be worsened when the laminar bands to be fused together move at high speed through the fusing zone.

Accordingly it is the object of the present invention to further develop equipment of the initially cited kind so that accurate laminar band compression in the compression gap is possible during fusing.

This problem is solved in that the second compressing member is constituted by a resiliently borne, sheetmetal-like support which mechanically elastically loads the laminar bands in the direction of the first compressing member.

Therefore the basic concept of the present invention is that the second compressing member be a sheetmetal-like support which is borne resiliently and compresses the laminar bands in the compression gap toward the first compressing member with the required resiliency. In this respect it was discovered that said support assures reliable and safe laminar band compression even at high laminar band speeds through the compression gap.

A first embodiment mode of the present invention provides that the support shall rest by its side away from the compression gap on a resilient body. This resilient body may be a deformable solid, but also a tubular body for instance. The material of the tubular or solid body may be a deformable plastic. In such embodiment modes of the present invention, the laminar bands may be compressed in especially effective manner in the compression gap. Alternatively the resilient body may be a compression spring.

Said support may be made of sheetmetal. Alternatively sheetmetal-like components may be made of plastics or similar resilient materials. Also the support may be fitted with a coat of laser light reflecting material, for instance a metal. In a preferred further embodiment mode of the present invention, the sheetmetal consists of aluminum, copper, silver, gold, in particular of steel and especially 18/10 stainless steel.

The specular surface reflects at least a portion of the incident laser beam toward the first compressing member. Advantageously therefore the portion of laser radiation not absorbed by the laminar bands in the compression gap then is reflected into this gap and new absorption takes place again in it. As a result this radiation portion contributes to heating the laminar bands and energy efficiency in particular is raised.

In a further embodiment mode of the present invention, said support is highly specular for laser radiation and offers low heat conductivity. The reflection in particular may be $\geq 70\%$, preferably $\geq 80$ and in especially preferred manner $\geq 90\%$ of the incident radiation. The thermal conductivity may be $\leq 400$ W/(m*k), preferably $\leq 200$ W/(m*k), even more preferably $\leq 100$ W/(m*k), and in especially preferred manner $\leq 20$ W/(m*k). Such a support may be made of a metal, or of a plastic with incorporated metal particles, and contributes to the laser radiation being applied even more efficiently to fuse the laminar bands because the incident radiation is reflected especially well. Additionally, the heat generated by the laser radiation absorption in the support is not spread across the support but dissipated at least in part in the laminar bands in the compression gap. In this manner the laser radiation contributes to heating the laminar bands in the compression gap.

Moreover the support thickness may be 0.01 to 0.2 mm thick, especially preferably from 0.02 to 0.1 mm and especially being 0.05 mm. A support having that thickness offers good resilience and high resistance to wear.

The compressing members are able to compress the laminar bands at 1 to 8 bars, especially preferably at 2 to 6 bars, and in particular at 3 bars. Such a pressure reliably and uniformly fuses the laminar bands.

The equipment also may be fitted with a laminar band heater heating said laminar bands before they enter the compression gap. Illustratively such a heater may be constituted by IR radiators and/or resistance heaters and/or hot air blowers. Experiment has shown furthermore that the preheated laminar bands, foremost when at a temperature of 40 to 80° C. and in particular of 60 to 70° C. allow especially reliable fusing. Such a design is very advantageous when the laminar bands are made to pass at high speeds through the compression gap.

In a further embodiment mode of the present invention, the laser's power is $\geq 100$ w and $\leq 700$ w and in particular $\geq 120$ w and $\leq 300$ w. The laser may be designed for a wavelength $\geq 800$ nm and $\leq 1,200$ nm and in particular $\geq 900$ nm and $1,100$ nm $\leq$. Furthermore laser radiation in the near and/or far infrared also may be used.

The first compressing member may be a roller. This feature is especially advantageous when the laminar bands must be moved through the compression gap. In that case the laminar bands will be uniformly compressed during fusion.

The compressing roller may be fitted with an elastic layer transparent to the laser radiation and in particular it may be made of silicone. In that case the two compressing members are elastic and their enhanced flexibility offers further improved laminar band compression in the compression gap.

The laser also may be configured within the compressing roller.

In a further embodiment mode of the present invention, a feed implement is used to feed at least two laminar bands into the compression gap and another device receiving the fused laminar bands. Using this special design, the laminar bands also may be fused to each other continuously.

The compressing members and the laser may be configured to fuse the laminar bands to each other in their longitudinal direction or alternatively in their transverse direction.

In a further embodiment mode of the present invention, the equipment comprises a rotatably supported drum spaced from the first compressing member, the drum axis being parallel to the transverse direction of the laminar bands. At least one compressing member is configured in such manner in a drum recess that the compressing members always subtend between themselves the compression gap when the compressing members are mutually opposite as the drum is being rotated. This design allows discontinuously fusing to each other the laminar bands moved through the compression gap. Fusing takes place thereby only when the compressing members subtend said compression gap. In a particular optional feature, the laser may be actuated by a control synchronously with the drum rotation.

Again, the compressing member may be configured in the drum recess parallel to the drum axis. In this manner the laminar bands may be discontinuously fused to each other in their transverse direction.

The present invention is elucidated below by means of an illustrative embodiment and in relation to the appended drawing.

The single FIGURE schematically shows equipment 1 of the present invention to fuse two superposed laminar bands 2. The laminar bands 2 may be made of thermoplasts such as PVC, PE and/or PET. Their structure may textile or foliate and their shapes and dimensions are variable.

The equipment 1 comprises a first compressing member 3 and a second compressing member 4 which between them subtend a compression gap 5. The laminar bands 2 pass through the compression gap 5 wherein they are compressed.

The first compressing member 3 is a roller fitted in this instance with an elastic silicone layer 6 transparent to the laser radiation. A laser 7 is mounted inside the first compressing member 3 and emits its radiation 8 passing through the first compressing member 3, the elastic layer 6 and the compression gap 5, being directed at the second compressing member 4 on which it is incident.

The second compressing member 4 comprises an elastically borne support in the form of a sheetmetal 9 which in this instance is arcuately prestressed and as such is configured in the recess 10 of a holder 11. By its side away from the compression gap 5, the sheetmetal 9 rests on a resilient body 12. In this instance the component 12 is tubular and made of a deformable plastic.

In order to transversely fuse into each other the laminar bands 2, the laser 7 generates radiation 8 into the compression gap 5. A narrow laser beam may be swept over the laminar bands' zones to be fused. Alternatively direct laser radiation 8 may be emitted by the laser 7, said radiation spreading over the full zone to be fused of the laminar bands 2.

The laminar bands 2 are compressed by the compressing members 3 and 4 especially in the zone where the laser radiation 8 is incident on them. In this manner the laminar bands 2 absorbing part of the laser radiation 8 and being heated by it will reliably bond when fusing into each other and thereby a qualitatively very high quality fusion seam shall be attained.

That portion of the laser radiation 8 not absorbed by the laminar bands 2 is incident on the sheetmetal 9 and is reflected at least partly at said sheetmetal's surface back into the compression gap 5. There the reflected laser beam can be once more absorbed by the laminar bands 2, heating them further and hence contributing to a more efficient use of the laser power. Moreover that part of the laser radiation 8 which will be absorbed by the sheetmetal 9 while heating it is imparted at least in part as heat to the laminar bands 2 in the compression gap 5. Consequently the laser radiation 8 absorbed by the sheetmetal 9 also contributes to heating the laminar bands 2, increasing the energy efficiency of the equipment 1.

The laminar bands 2 may be made to move into the compression gap 5 using an omitted feed implement. In that case a device receiving the fused laminar bands 2 is configured behind the compression gap 5. In this manner the superposed laminar bands 2 may be guided through the compression gap 5 and then may be optionally continuously fused into each other, the equipment of the present invention enabling especially high fusing rates. Depending on the configuration of the compressing members 3, 4 and the laser 7, the laminar bands 2 may be fused longitudinally and transversely.

In an alternative embodiment mode of the present invention, the equipment 1 comprises a rotatably supported drum of which the axis runs parallel to the transverse direction of the laminar bands 2. Said drum is fitted with at least one recess receiving the lower compressing member 4. Moreover several mutually spaced recesses may be used, each containing a lower compressing member 4.

During the rotation of said drum, the upper compressing member 3 and the lower compressing member 4 will always subtend the compression gap 5 between them when the compressing members 3, 4 are mutually opposite.

By means of this embodiment mode, the laminar bands 2 may be fused into each other transversely at predetermined transverse spacings. Fusing shall take place whenever the compressing members 3, 4 subtend the compression gap 5. Additionally the laser 7 may be controlled into synchronization with the drum rotation.

The equipment 1 of the present invention offers the substantial advantage of enabling constant, accurate compression of the laminar bands 2 in the compression gap 5 during their fusion by means of the design of the second compressing member 4. Consequently a continuously optimal compression is generated, the fused seam being implemented thereby with great uniformity and high quality.

Experiment has shown that the equipment of the present invention is especially appropriate to fuse PVC, PP and PET foils, bands and the like. In particular laser power in the range $\geq 120$ watt and $\leq 300$ watt and laser wavelength of $\geq 800$ nm and $\leq 1,200$ nm were found especially appropriate. High fusing rates for said materials foremost could be attained when using a stainless steel sheetmetal 9 with a thickness between 0.01 and 0.2 mm. An especially preferred pressure range was found to be between 1 and 8 bar. Heating said foils, bands 2 and the like to a temperature of 70 to 80° C. using a heater before they entered the compression gap 5 also was advantageous.

The invention claimed is:

1. Equipment (1) to fuse at least two superposed laminar bands (2) by means of two compressing members (3, 4) subtending between them a compression gap (5) shaping the laminar bands (2) and comprising a laser (7) configured to generate laser radiation (8) passing through the first compressing member (3) and the compression gap (5) toward the second compressing member (4), said second compressing member being fitted with a laser radiation reflecting surface reflecting at least a portion of the incident laser beam (8) toward the first compressing member (3), characterized in that the second compressing element (4) is constituted by an elastically supported sheetmetal (9) which resiliently mechanically loads the laminar bands (2) in the compression gap (5) in the direction of the first compressing member (3).

2. Equipment (1) as claimed in claim 1, characterized in that, its side away from the compression gap (5), the sheetmetal (9) rests on a resilient body (12).

3. Equipment (1) as claimed in claim 2, characterized in that the resilient body (12) is a deformable solid or hollow body.

4. Equipment (1) as claimed in claim 3, characterized in that the resilient body (12) is tubular.

5. Equipment (1) as claimed in claim 3, characterized in that the solid or hollow body is made of a deformable plastic.

6. Equipment (1) as claimed in claim 2, characterized in that the resilient body (12) is a compression spring.

7. Equipment (1) as claimed in claim 1, characterized in that the sheetmetal (9) exhibits a high reflection coefficient for laser radiation, in particular $\geq 70\%$, preferably $\geq 80\%$ and in particular $\geq 90\%$ and low heat conductivity especially $\leq 400$ w(/m*k), preferably $\leq 200$ w(/m*k), especially preferred $100$ w(/m*k)$\leq$ and especially preferred $\leq 20$ w(/m*k).

8. Equipment (1) as claimed in claim 1, characterized in that the sheetmetal (9) is made of aluminum, copper, silver, gold, in particular of steel and especially of 18/10 stainless steel.

9. Equipment (1) as claimed in claim 1, characterized in that the thickness of the sheetmetal (9) is between 0.01 and 0.2 mm, preferably between 0.2 and 0.1 mm and especially preferred 0.05 mm.

10. Equipment (1) as claimed in claim 1, characterized in that the compressing members (3, 4) compress the laminar bands (2) at a pressure between 1 and 8 bar, especially preferably between 2 and 6 bar and in particular at 3 bar.

11. Equipment (1) as claimed in claim 1, characterized in that a heater is used for the laminar bands (2) heating them before they enter the compression gap (5).

12. Equipment (1) as claimed in claim 1, characterized in that the power of the laser (7) is $\geq 100$ w and $\leq 700$ w and especially $\geq 120$ w and $\leq 300$ w.

13. Equipment (1) as claimed in claim 1, characterized in that the laser (7) is designed for a laser beam (8) having a wavelength $\geq 800$ nm and $\leq 1,200$ nm and in particular $\geq 900$ nm and $\leq 1,100$ nm.

14. Equipment (1) as claimed in claim 1, characterized in that the first compressing member (3) is a compressing roller.

15. Equipment (1) as claimed in claim 14, characterized in that the compressing roller (3) is fitted with an elastic layer (6) transparent to the laser radiation (8) and preferably made of silicone.

16. Equipment (1) as claimed in claim 13, characterized in that the laser (7) is configured within the compressing roller (3).

17. Equipment (1) as claimed in claim 16, characterized in that the compressing roller (3) is fitted with a semi-transparent surface which is transparent to the laser radiation (8) directly transmitted from the laser (7) and which reflects laser radiation incident on it from the compression gap (5).

18. Equipment (1) as claimed in claim 1, characterized in by feed implement guiding at least two laminar bands (2) into the compression gap (5) and by apparatus receiving the fused laminar bands.

19. Equipment (1) as claimed in claim 18, characterized in that the compression members (3, 4) and the laser (7) are configured in a way to fuse the laminar bands (2) in their longitudinal direction.

20. Equipment (1) as claimed in claim 18, characterized in that the compressing members (3, 4) and the laser (7) are configured in a manner to fuse to each other the laminar bands (2) at predetermined intervals in their transverse direction.

21. Equipment (1) as claimed in claim 18, characterized in that it comprises a rotatably supported drum which is configured a distance away from the first compressing member (3) and of which the axis runs parallel to the transverse direction of the laminar bands (2), at least one compressing member (4) being configured in a recess of said drum, and in that the compressing members (3, 4) shall subtend between them the compression gap (7) whenever they are mutually opposite during the drum's rotation.

22. Equipment (1) as claimed in claim 21, characterized in that the compressing member (4) is configured in said recess parallel to the drum's axis.

* * * * *